United States Patent [19]

Bernhard et al.

[11] Patent Number: 4,537,636

[45] Date of Patent: Aug. 27, 1985

[54] PROCESS FOR THE PREPARATION OF NACREOUS PIGMENTS WITH IMPROVED GLOSS PROPERTIES, PRODUCTS THEREOF, AND COMPOSITIONS USING SAID PIGMENTS

[75] Inventors: Horst Bernhard, Schwarzenberg, Austria; Reiner Esselborn, Darmstadt, Fed. Rep. of Germany

[73] Assignee: Merck Patent Gesellschaft mit beschrankter Haftung, Darmstadt, Fed. Rep. of Germany

[21] Appl. No.: 480,200

[22] Filed: Mar. 30, 1983

Related U.S. Application Data

[63] Continuation-in-part of Ser. No. 453,045, Dec. 27, 1982, Pat. No. 4,494,993.

[30] Foreign Application Priority Data

Mar. 30, 1982 [DE] Fed. Rep. of Germany ....... 3211602

[51] Int. Cl.$^3$ .............................................. C09C 3/00
[52] U.S. Cl. .................................... 106/291; 106/309; 106/DIG. 3
[58] Field of Search ................... 106/309, 291, 308 B, 106/DIG. 3; 427/214, 218, 219; 428/363, 404

[56] References Cited

U.S. PATENT DOCUMENTS

| | | | |
|---|---|---|---|
| 3,087,828 | 4/1963 | Linton | 106/291 |
| 3,087,829 | 4/1963 | Linton | 106/291 |
| 3,342,617 | 9/1967 | Jackson | 106/291 |
| 3,650,790 | 3/1972 | Klenke et al. | 106/291 |
| 3,711,308 | 1/1973 | Brand et al. | 106/291 |
| 3,833,208 | 8/1974 | Jackson | 106/308 Q |
| 3,926,659 | 12/1975 | Bernhard et al. | 106/291 |
| 4,134,776 | 1/1979 | Rieger et al. | 106/291 |

Primary Examiner—G. L. Kaplan
Attorney, Agent, or Firm—Millen & White

[57] ABSTRACT

A process for preparing nacreous pigments having improved gloss properties and based on mica platelets coated with metal oxides comprises suspending mica platelets in a solution containing titanium sulfate, the mica platelets having a coating comprising a homogeneous mixture of titanium dioxide, aluminum oxide and silicon dioxide, and further coating the suspended platelets by slow heating of the suspension.

7 Claims, No Drawings

4,537,636

PROCESS FOR THE PREPARATION OF NACREOUS PIGMENTS WITH IMPROVED GLOSS PROPERTIES, PRODUCTS THEREOF, AND COMPOSITIONS USING SAID PIGMENTS

CROSS REFERENCE TO RELATED APPLICATION

This application is a continuation-in-part of U.S. application Ser. No. 453,045 of Dec. 27, 1982, now U.S. Pat. No. 4,494,993, whose entire disclosure is incorporated by reference herein.

BACKGROUND OF THE INVENTION

The present invention relates to a process for preparing nacreous pigments which have improved gloss properties and are based on mica flakes coated with metal oxides, e.g., mica coated with a layer of hydrated titanium dioxide in aqueous suspension and then washed, dried and heated.

The intensity and purity of the interference color of these pigments depends decisively on the formation of the metal oxide layer precipitated on the mica flakes. In addition to a homogeneous layer thickness, the chief requirements are that the layer is formed free of cracks and displays as little light scattering as possible. It is known that both cracks, which especially may occur in thicker layers when the pigments are heated, and, in particular, the size of the metal oxide crystals precipitated on the mica, play a decisive role in determining the degree of scattering. It is also known that the scatter in the layer in the area in question is greater the larger the individual crystals of the precipitated metal oxide.

The diffuse light formed at the scatter centers in the metal oxide layer on the one hand reduces the intensity at the glancing angle of the reflected portion of light and hence the color saturation, and on the other hand causes a whitening of the interference color. If the crystals are too large, the nacreous luster and the interference color disappear completely.

According to earlier Federal Republic of Germany Application P 31 51 354, corresponding to U.S. application No. 453,045 of Dec. 27, 1982, it had been found that very homogeneous and stable precipitates which do not tend to form cracks when heated are achieved by simultaneous precipitation of $SiO_2$ and $Al_2O_3$ together with the hydrated titanium dioxide. These pigments have an increased transparency and tinctorial strength and can very advantageously be used for all the customary purposes. However, because $SiO_2$ and $Al_2O_3$, which both have a low refractive index, are also precipitated, the refractive index of the metal oxide layer is significantly reduced in comparison with a pure $TiO_2$ precipitate. This means that the proportion of light reflected at the surface of these pigment particles is less than that in the case of pure $TiO_2$/mica pigments.

Although the velvety gloss achieved with these earlier pigments is particularly suitable for many applications, pigments with sharp gloss and bright sparkle are required for other applications.

SUMMARY OF THE INVENTION

Accordingly, it is an object of the present invention to provide pigments which have the bright gloss of pigments with a pure $TiO_2$ coating, but in addition display reduced light scatter and increased color saturation through a homogeneous and crack-free layer.

Upon further study of the specification and appended claims, further objects and advantages of this invention will become apparent to those skilled in the art.

These objects have been attained by this invention by providing a process for the preparation of nacreous pigments which have improved gloss properties and are based on mica flakes coated with metal oxides, the mica being coated with a layer of hydrated titanium dioxide in aqueous suspension and then washed, dried and calcined, wherein the process is carried out as a two-stage process in which, initially, a layer of hydrated titanium dioxide is precipitated as a single layer together with silicon dioxide and aluminum hydroxide and the pigment thus obtained is washed, dried and calcined, and then is suspended in a solution containing titanium sulfate, and coated again by slow heating of the suspension.

This invention also relates to the pigments thus obtained and their use.

DETAILED DESCRIPTION

It did not seem possible to achieve a combination of the desired properties, since, on the one hand, the increase in the refractive index by reduction of the proportion of constituents in the layer which have a low refractive index (e.g., $SiO_2$ and $Al_2O_3$) increases the inhomogeneity and crack formation in the layer, but, on the other hand, the constituents added to avoid these disadvantages reduce the refractive index again. However, it has now been found that, surprisingly, the desired object can be achieved by the two-stage coating of this invention comprising a coating carried out according to the earlier application No. P 31 51 354 followed by a second coating in the presence of titanium sulfate.

An advantage of the pigments of this invention is that, by the process of this invention, it has surprisingly been possible to combine, in one pigment, both high transparency and tinctorial strength through homogeneous crack-free layers and bright gloss through a high refractive index. This could not be predicted nor thought possible. Rather, it had to be assumed by skilled artisans that, at best, only a compromise between the two properties would be possible.

The pigments of this invention are prepared by a two-stage process, the first stage being identical to the process according to the earlier application P 31 51 354 and corresponding to U.S. application No. 453,045. In this process, mica flakes, which as a rule are about 5–200 $\mu$m in diameter and about 0.1–5 $\mu$m thick, are suspended in an aqueous solution, which is brought to a pH value of about 0.5–5, in particular about 2.0–3.0, with a suitable acid, such as, for example, hydrochloric acid or sulfuric acid. The suspension is heated to about 50°–100° C., preferably about 70°–80° C., and a titanium salt solution is then allowed to run in slowly, the pH value of the suspension being kept substantially constant by simultaneous addition of a base. Any soluble titanium salt can be used as the titanium salt. $TiCl_4$ or titanyl sulfate is preferably used.

According to the process of No. P 31 51 354, precipitation of the hydrated titanium dioxide is carried out in the presence of aluminum ions. It is irrelevant whether the aluminum ions are initially introduced into the precipitation vessel or are contained in the titanium salt solution. In principle, all aluminum salts which are soluble in the appropriate titanium salt solutions can be used. The aluminum salt with an anion corresponding to the titanium salt is in each case preferred, i.e., in particular, aluminum chloride or aluminum sulfate. The aluminum ions are selected such that a weight ratio of $TiCl_4:AlCl_3.6H_2O$ of about 50:1 to about 2:1, preferably about 30:1 to about 5:1, or corresponding weight ratios when other salts are used, is maintained.

The $SiO_2$ which, according to P 31 51 354, is to be precipitated simultaneously is preferably added to the base which is metered in at the same time as the acid titanium salt solution in order to maintain the pH value of the precipitation suspension. The base used is preferably an alkali metal hydroxide solution, in particular NaOH, which contains the silicon dioxide which is also to be precipitated, preferably in the form of a soluble alkali metal silicate, for example as sodium silicate. If NaOH is used as the base, an $NaOH:SiO_2$ weight ratio from 5:1 to 400:1, preferably from 20:1 to 200:1, is maintained as a rule, corresponding ratios being used in other systems.

The two solutions are preferably added slowly such that the hydroxide or hydrated oxides which form by hydrolysis in the mica suspension are in each case completely deposited on the surface of the mica, without substantial amounts of by-products which are freely mobile in the suspension forming. The feed rates thus are usually chosen so that about $0.01-20 \times 10^{-5}$ mole of salts to be precipitated is added per minute and per square meter of surface to be coated. Coating times of several hours to several days are required, depending on the desired thickness of the coating.

When the desired layer thickness or desired interference color has been achieved, the coating operation is ended and the pigments are separated off, washed, dried and calcined, analogously to the customary process. Temperatures of about 500°–1,000° C., in particular 700°–1,000° C., are used for the calcination, the precipitated metal hydroxides or hydrated oxides being dehydrated and converted into the corresponding oxides. The metal oxide layer contains titanium, silicon and aluminum in oxidic form and, where relevant, also as other compounds, such as, for example, in the form of aluminum silicate, side by side in homogeneous distribution. The proportion of silicon, calculated as $SiO_2$ and based on the total composition of the metal oxide layer, is as a rule about 0.1 to about 20 percent by weight, preferably about 1–10 percent by weight, and the proportion of aluminum, calculated as $Al_2O_3$ and also based on the total composition of the metal oxide layer, is about 0.1 to about 20 percent by weight, preferably about 0.2 to about 10 percent by weight. $SiO_2$ and $Al_2O_3$ together as a rule make up 0.2–30 percent by weight, preferably about 2–20 percent by weight, on the same basis.

The crude pigment thus obtained, which, in addition to the $SiO_2$ and $Al_2O_3$ additives, also of course can contain other coloring or non-coloring metal oxides, such as, for example, chromium oxide or iron oxide, is then subjected to a second coating. The pigment is suspended in water again, and a titanium salt solution is added. It is essential that the crude pigment come into contact with the titanium salt solution before the hydrolysis to hydrated titanium dioxide starts, and that the hydrolysis is only then set in motion by suitable measures. This can be effected, for example, by adding the titanium salt solution to the crude pigment and then heating the suspension slowly to the boiling point, whereupon hydrolysis starts and hydrated titanium dioxide is precipitated.

Two things happen during this second coating. On the one hand, as a result of the change in the layer thickness by the additionally precipitated hydrated titanium dioxide, the interference color of the crude pigment is modified in accordance with the thicker layer. On the other hand, the refractive index of the pigment is substantially increased. It can be assumed that when the crude pigment is suspended in the titanium salt solution, this solution penetrates into the layer already precipitated and, during the subsequent hydrolysis, precipitation occurs not only on but also into the layer first precipitated, and this layer additionally becomes more dense.

However, this cannot be the sole explanation of the surprising advantageousness of the pigments obtained by the process of this invention, since it has been found that any desired titanium salt solutions, and especially the chloride or sulfate, can indeed be used for the preparation of the crude pigment, but not for the second precipitation. Surprisingly, particularly advantageous pigments are obtained if a titanyl sulfate solution or a titanium salt solution which contains at least a certain amount of sulfate ions is used for the second precipitation. In the latter case, this amount should preferably be at least about 0.5–2 times the stoichiometric amount. Typically, the concentration of titanium ion in the final medium is about 0.2–0.6M.

The second coating operation is continued until the interference color desired for the end product is achieved. Typically, coating times are 1–10 hours. The pigment is then, in the customary manner, separated off, washed, dried and calcined again at a temperature of 500° to 1,000° C.

The pigments thus obtained have a substantially increased brilliance, a measurably higher gloss and an outstanding tinctorial strength. The pigments can be used in the same manner as those hitherto known, that is to say, for example, for pigmenting plastics, paints and lacquers, and in particular also in bodycare agents and cosmetics.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all temperatures are set forth uncorrected in degrees Celsius; unless otherwise indicated, all parts and percentages are by weight.

EXAMPLE 1

(A) Preparation of a sulfate-containing titanium salt solution 370 ml of a 20% solution of $TiCl_4$ in 5% hydrochloric acid is added dropwise to a clear solution of 36.25 g of $Na_2SO_4$ in 125 ml of water. The excess acid is then neutralized by dropwise addition of 22.5 ml of 15% sodium hydroxide solution, and the clear solution is made up to 1 liter with water.

(B) Preparation of the crude pigment

A suspension of 60 g of potash mica of the 10–70 $\mu m$ particle fraction in 2 liters of water is heated to 75° C. and adjusted to a pH of 2.6 with hydrochloric acid. A solution containing 15 percent by weight to $TiCl_4$, 5 percent by weight of HCl and 20 g/liter of $AlCl_3.6H_2O$ and a solution containing 15 percent by weight of NaOH and 3.3 g/liter of $SiO_2$ (as sodium silicate) are then metered in at the same time, such that the pH value is kept constant at 2.6. When a golden interference color has been achieved, the coating operation is discontinued and the pigment is filtered off, washed salt-free, dried at 120° C. and heated at 800° C. for 30 minutes.

(C) Second coating

A suspension of 100 g of the pigment according to Example 1B in 400 ml of titanium salt solution according to Example 1A is heated to 100° C. in the course of 30 minutes and is kept at this temperature until the interference color, which slowly passes to red-blue, no longer changes, which is the case after about 2 hours. The pigment is then separated off, washed, dried at 120° C. and heated at 800° C. for 30 minutes. A pigment with a strong red-blue interference color and high brilliance is obtained.

EXAMPLE 2

A pigment which has been prepared according to Example 1B and has a blue interference color is coated at 100° C. analogously to Example 1C. After the customary working-up, a pigment which has a strong green interference color and high brilliance is obtained.

In an analogous manner, crude pigments of any desired interference colors can be provided with a second coating to increase the tinctorial strength and brilliance.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing nacreous pigments having improved gloss properties and based on mica platelets coated with metal oxides, comprising suspending mica platelets in a first aqueous medium comprising aluminum, silicon and titanium ions corresponding to the amount to be incorporated into the metal oxide layer and uniformly coprecipitating thereon titanium dioxide hydrate, silicon dioxide and aluminum hydroxide to form a uniform layer homogeneously containing about 0.1 to about 20 percent by weight of $SiO_2$ and about 0.1 to about 20 percent by weight of $Al_2O_3$, wherein the uniform coprecipitation of the titanium, silicon and aluminum is achieved by suspending mica platelets in an aqueous solution of a pH of about 0.5-5, heating the solution to about 50°-100° C., adding a soluble titanium salt thereto and maintaining the solution pH substantially constant, and simultaneously adding $SiO_2$ to the solution in the form of a soluble silicate salt, these additions being effected in the presence of aluminum ions in the solution, and then separating, washing, drying and calcining the coated mica platelets; suspending the coated mica platelets in a second aqueous medium containing titanium sulfate prior to the point at which the titanium solution has begun substantially to hydrolyze to hydrated titanium dioxide, further coating the suspended platelets by slow heating of the suspension, and then separating, washing and calcining the further coated platelets.

2. A process of claim 1 wherein the calcination is conducted at 500°-1,000° C.

3. A process of claim 1 wherein said suspension solution comprises an amount of sulfate ions 0.5-2 times the stoichiometric amount based on the amount of titanium ions in the solution.

4. A process of claim 1 wherein the titanium is present in said first aqueous medium as titanyl sulfate or $TiCl_4$ and the aluminum is present as aluminum chloride or aluminum sulfate.

5. A process of claim 1 wherein said homogeneous coating contains a total amount of $SiO_2$ and $Al_2O_3$ of 0.2-30 percent by weight.

6. Nacreous pigments based on mica flakes prepared by the process of claim 1.

7. In a composition comprising a base ingredient and a nacreous pigment prepared by suspending mica platelets in a first aqueous medium comprising aluminum, silicon and titanium ions corresponding to the amount to be incorporated into the metal oxide layer and uniformly coprecipitating thereon titanium dioxide hydrate, silicon dioxide and aluminum hydroxide to form a uniform layer homogeneously containing about 0.1 to about 20 percent by weight of $SiO_2$ and about 0.1 to about 20 percent by weight of $Al_2O_3$, wherein the uniform coprecipitation of the titanium, silicon and aluminum is achieved by suspending mica platelets in an aqueous solution of a pH of about 0.5-5, heating the solution to about 50°-100° C., adding a soluble titanium salt thereto and maintaining the solution pH substantially constant, and simultaneously adding $SiO_2$ to the solution in the form of a soluble silicate salt, these additions being effected in the presence of aluminum ions in the solution, and then separating, washing, drying and calcining the coated mica flakes; the improvement which comprises suspending the coated mica platelets in a second aqueous medium containing titanium sulfate prior to the point at which the titanium solution has begun substantially to hydrolyze to hydrated titanium dioxide, further coating the suspended platelets by slow heating of the suspension, and then separating, washing and calcining the further coated platelets.

* * * * *